(12) United States Patent
Lutz

(10) Patent No.: US 6,193,257 B1
(45) Date of Patent: Feb. 27, 2001

(54) STEERING SYSTEM FOR A MULTIPLE VEHICLE TRAIN

(76) Inventor: Bobby J. Lutz, Rte. 1, Box 11, Powersville, MO (US) 64672

(*) Notice: Subject to any disclaimer, the term of this patent is extended or adjusted under 35 U.S.C. 154(b) by 0 days.

(21) Appl. No.: 09/346,824

(22) Filed: Jul. 2, 1999

(51) Int. Cl.⁷ ................................................ B60D 53/00
(52) U.S. Cl. ................................... 280/408; 280/419
(58) Field of Search .................................. 280/408, 419, 280/426, 442, 443, 444, 461.1

(56) References Cited

U.S. PATENT DOCUMENTS

| | | | |
|---|---|---|---|
| 776,405 | * 11/1904 | Koppel | 280/442 |
| 776,994 | * 12/1904 | Brennan | 280/419 |
| 798,189 | * 8/1905 | Koppel | 280/442 |
| 850,514 | * 4/1907 | Benson | 280/426 |
| 902,821 | * 11/1908 | Jonas | 280/426 |
| 1,286,367 | * 12/1918 | Loyer | 280/419 |
| 1,416,613 | * 5/1922 | Colardeau | 280/408 |
| 1,529,630 | * 3/1925 | Jonkhoff | 280/408 |
| 1,884,640 | * 11/1932 | Cambell | 280/426 |
| 1,999,748 | * 4/1935 | Bartatelli | 280/426 |
| 2,869,888 | * 1/1959 | Burger | 280/408 |
| 3,891,238 | 6/1975 | Ehlert . | |
| 4,382,607 | 5/1983 | Voight . | |
| 4,484,758 | 11/1984 | Murray . | |
| 5,071,152 | 12/1991 | Ducote . | |
| 5,163,698 | 11/1992 | Evens . | |
| 5,477,937 | 12/1995 | Chagnon . | |

* cited by examiner

Primary Examiner—Kevin Hurley
Assistant Examiner—Andrew J. Fischer
(74) Attorney, Agent, or Firm—Henderson & Sturm LLP

(57) ABSTRACT

A steering system for a multiple vehicle train that is pulled by a prime mover. A series of connected adjacent leading and trailing vehicles each have a single axle mounted under a rear body portion and are equipped with a triangular linkage. The linkage is defined by three connections: a pivotal connection of the axle to a rear portion of the vehicle body; a pivotal connection between the bodies of the leading and trailing vehicles; and a fore and aft movable connection between the body of the trailing vehicle and a tongue that extends back from the axle. When the vehicle train is traveling straight ahead, the movable connection is in its forwardmost position and the three connection points are aligned in a straight line where the axle is disposed perpendicular to the direction of travel. When the prime mover turns to the right the movable connection moves back and the connection points form a triangle which acts to pivot the axle to the left of its perpendicular position causing the rear of the vehicle to closely track the path of the front of the vehicle. When a left turn is made the linkage acts to pivot the axle to the right causing the rear of the vehicle to closely track the front. The steering system allows a multiple vehicle train to maneuver through relatively narrow passageways since the vehicles closely follow the path of the prime mover.

25 Claims, 4 Drawing Sheets

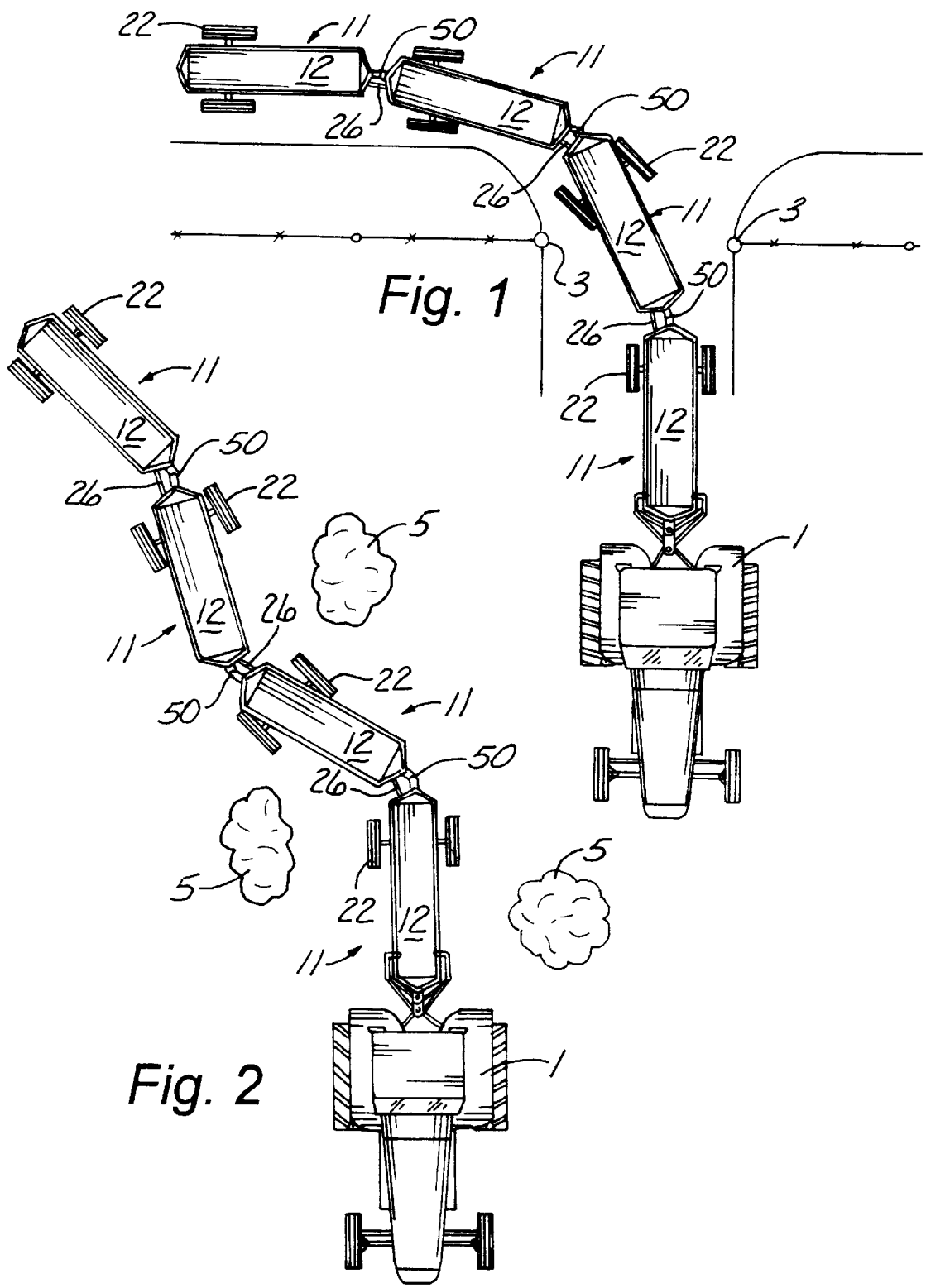

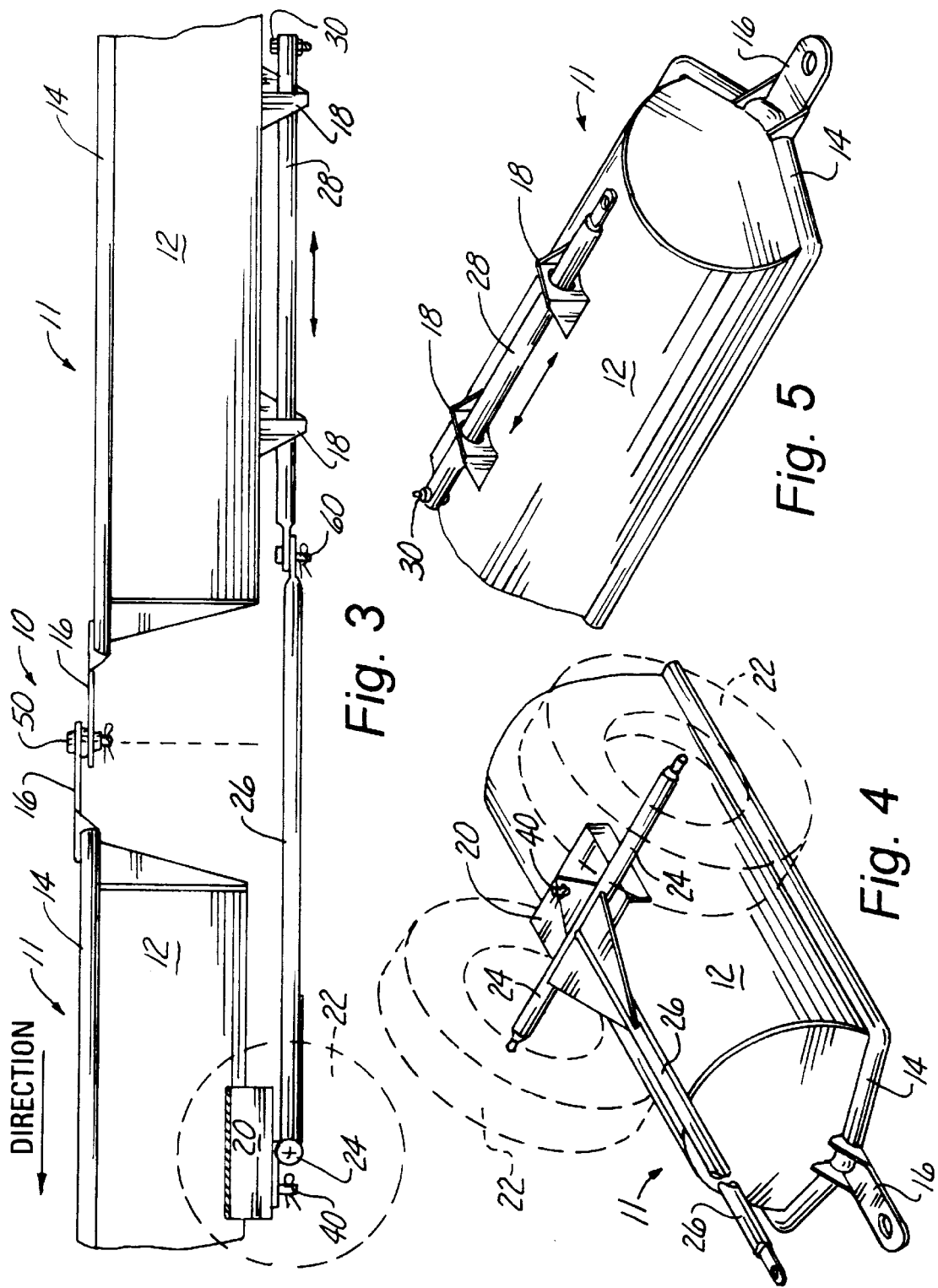

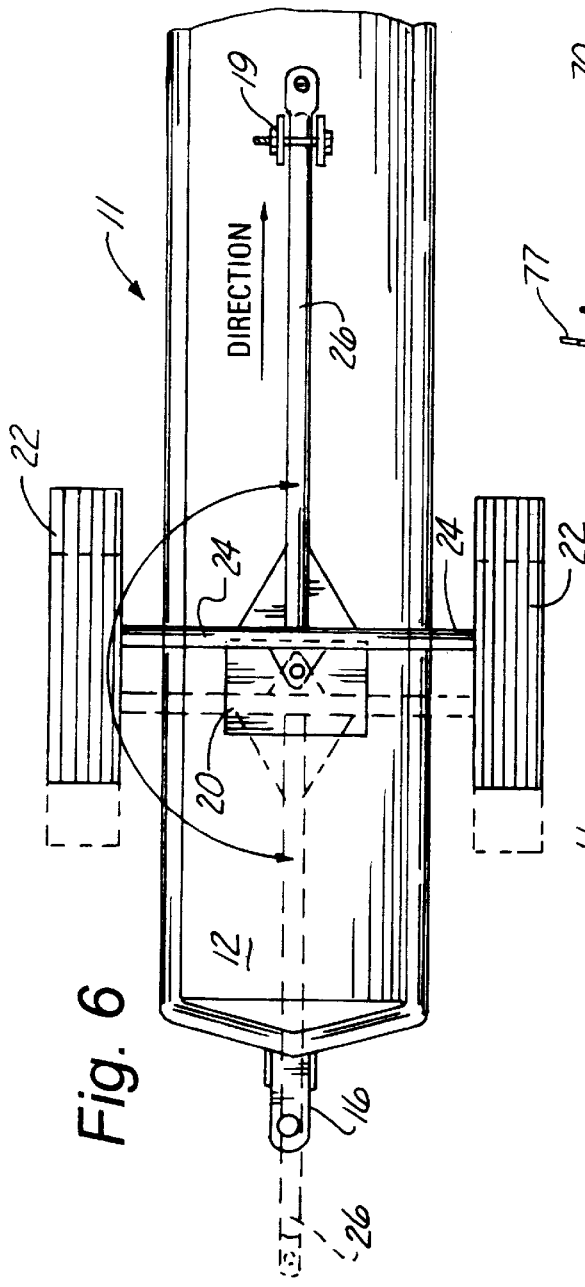
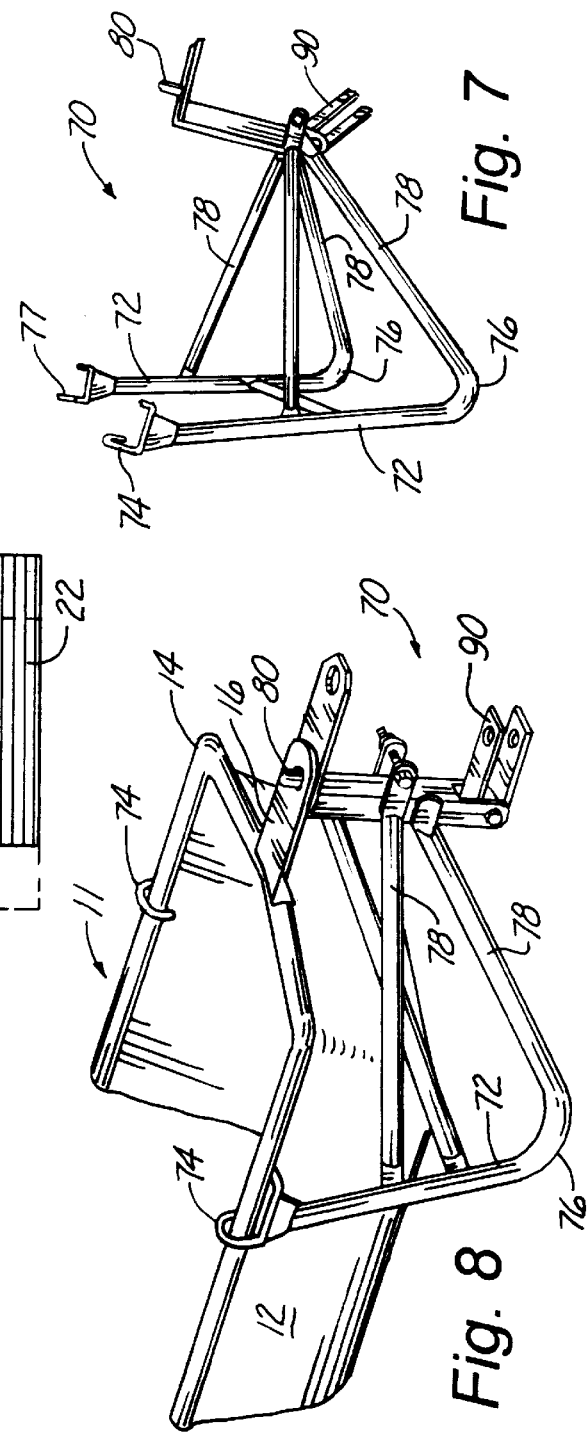

STEERING SYSTEM FOR A MULTIPLE VEHICLE TRAIN

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to the field of steering systems, and more particularly to a steering system for multiple vehicle trains.

2. Description of the Related Art

As can be seen by reference to the following U.S. Pat. Nos. 3,891,238; 4,382,607; 4,484,758; 5,071,152; 5,163,698; and 5,477,937, the prior art is replete with myriad and diverse steering systems.

While all of the aforementioned prior art constructions are more than adequate for the basic purpose and function for which they have been specifically designed, they are uniformly deficient with respect to their failure to provide a simple, efficient, and practical steering system for multiple vehicle trains.

Maneuverability of multiple vehicle trains is a concern for example in farming applications where multiple vehicles, such as, for example, a train of multiple feed bunks, must be moved through narrow gates or around buildings or other obstructions.

As a consequence of the foregoing situation, there has existed a longstanding need for a new and improved steering system and the provision of such a construction is a stated objective of the present invention.

BRIEF SUMMARY OF THE INVENTION

Briefly stated, the present invention provides a steering system for a multiple vehicle train that is pulled by a prime mover. A series of connected adjacent leading and trailing vehicles each have a single axle mounted under a rear body portion and are equipped with a triangular linkage. The linkage is defined by three connections: a pivotal connection of the axle to a rear portion of the vehicle body; a pivotal connection between the bodies of the leading and trailing vehicles; and a fore and aft movable connection between the body of the trailing vehicle and a tongue that extends back from the axle. When the vehicle train is traveling straight ahead, the movable connection is in its forwardmost position and the three connection points are aligned in a straight line where the axle is disposed perpendicular to the direction of travel. When the prime mover turns to the right, the movable connection moves back and the connection points form a triangle which acts to pivot the axle to the left of its perpendicular position, causing the rear of the vehicle to closely track the path of the front of the vehicle. When a left turn is made the linkage acts to pivot the axle to the right, causing the rear of the vehicle to closely track the front. The steering system allows a multiple vehicle train to maneuver through relatively narrow passageways since the vehicles closely follow the path of the prime mover.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 is a top plan view of a prime mover making a right hand turn while pulling a series of vehicles utilizing the steering system of the present invention;

FIG. 2 is a top plan view of a prime mover following a serpentine path around obstacles while pulling a series of vehicles using the steering system;

FIG. 3 is a side elevational view showing the steering system connections of a leading and trailing vehicle;

FIG. 4 is a partial perspective view of the underside of the rear of a feed bunk having the steering system;

FIG. 5 is a partial perspective view of the underside of the front of the feed bunk illustrating the aligned movement of the movable connecting bar;

FIG. 6 is a bottom plan view with full lines illustrating the position to which the tongue of the rearmost vehicle in a train is moved to secure the axle against pivotal movement;

FIG. 7 is a perspective view of a front end stand and hitch attachment for the front feed bunk;

FIG. 8 is a partial perspective view of the end stand and hitch attachment secured to the front of the feed bunk to be attached to a prime mover;

DETAILED DESCRIPTION OF THE INVENTION

Figure 9:
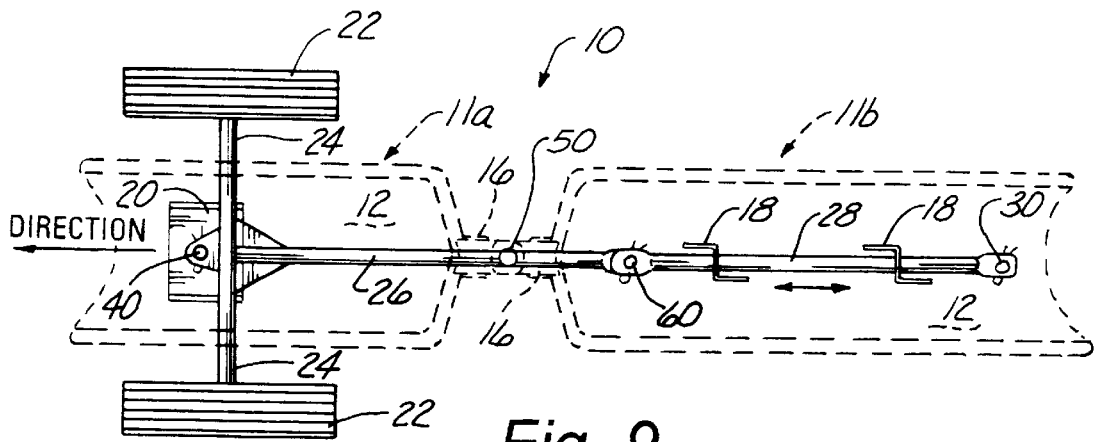
FIG. 9 is a top plan view showing the steering system configuration where the leading vehicle is traveling straight ahead.

As can be seen by reference to the drawings, and particularly to FIGS. 3, 9, 10, 11, a steering system (10) that forms the basis of the present invention is utilized in each of the vehicles (11) attached in series and being pulled by the tractor or prime mover (1). FIGS. 1 and 2 illustrate that each successive leading and trailing vehicle closely follows the path of the prime mover (1) providing snake-like manueverability of the vehicles (11) as the vehicle train moves between and around obstacles such as fence posts (3) and trees (5).

It should be understood that while the steering system (10) of the present invention is shown and described particularly with reference to the use of the steering system (10) on a train of feed bunks, this is but one practical application of the steering system (10) of the present invention. Thus, the identification of feed bunks as the vehicles (11) to which the steering system (10) has been adapted are included in this specification only for the purpose of providing an enabling disclosure and for disclosing the inventor's best mode for practicing the invention at the time the application was filed. Therefore, it should be readily appreciated that the steering system (10) of the present invention may be adapted to any other types of single axle or double axle vehicles (11), such as wagons, implements, etc. that may need to be connected in series to be towed behind a prime mover. Thus, the scope of the present invention should not be considered limited to the particular application shown and discussed herein.

Figure 10:
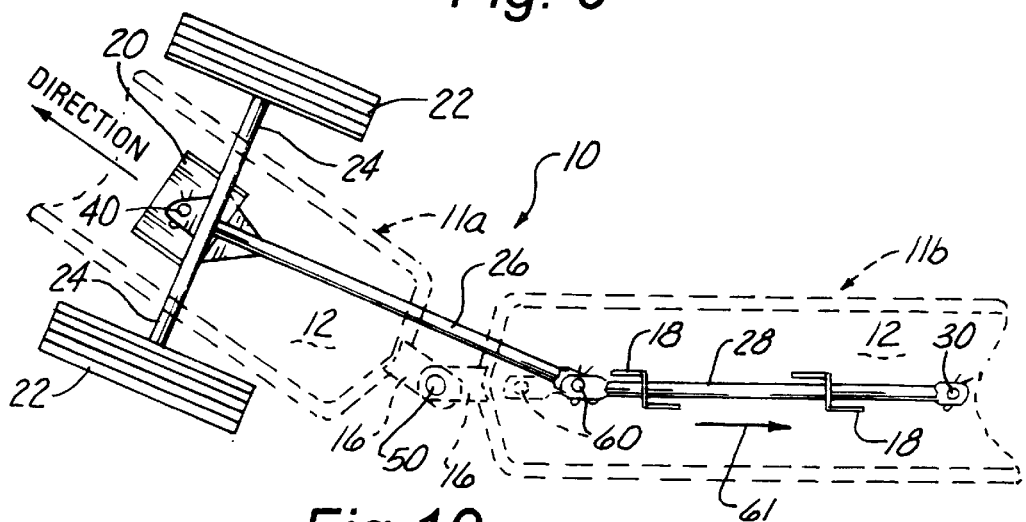
FIG. 10 is a top plan view showing the steering system configuration where the leading vehicle is turning to the right.
Figure 11:
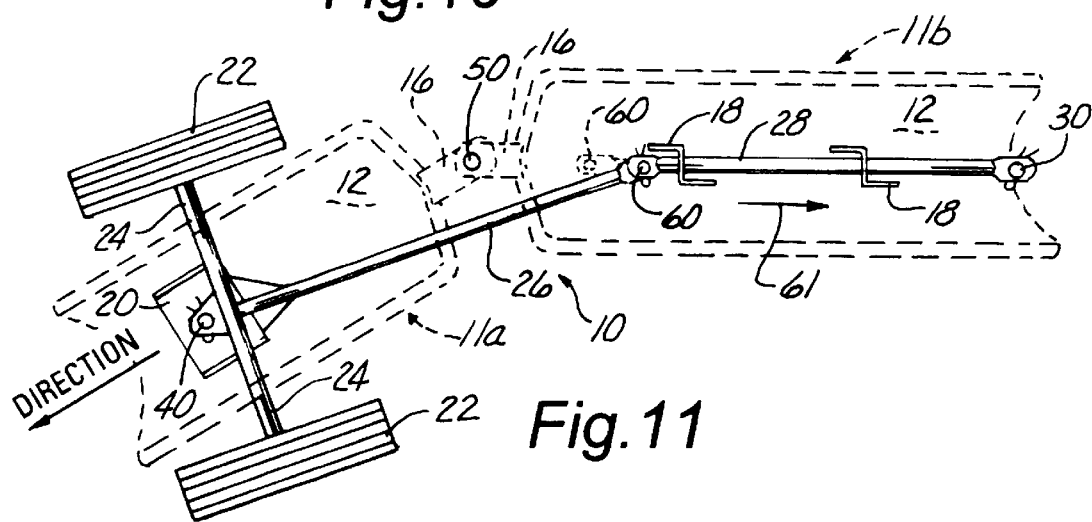
FIG. 11 is a top plan view showing the steering system configuration where the leading vehicle is turning to the left.

Turning now to a particular embodiment and application of the steering system (10) of the present invention, as most clearly shown in FIGS. 3–5, each of the feed bunks (11) include a body (12) having a top peripheral rim (14) with connection plates (16) extending from the front and rear. The front section of the underside of the body (12) carries a pair of spaced brackets (18), and the rear section of the underside of the body (12) carries an axle mounting plate (20). Ground wheels (22) are mounted on a single axle (24) and a forwardly extending elongated tongue (26) is operably attached to the axle (24) and extends normal thereto. A bar (28) having a stop (30) at the rear is slidably engaged in the brackets (18) for aligned fore and aft movement with respect to the body (12). As best illustrated in FIGS. 9–11, the axle (24) of the leading vehicle is pivotally attached at a first connection (40), the leading vehicle is pivotally attached to the trailing vehicle at a second connection (50), and the tongue (26) is pivotally attached to the sliding bar (28) at a third connection (60). The three pivotal connections (40, 50, 60) and their relation to the operation of the steering system (10) of the present invention are discussed in further detail later.

A hitch attachment and end stand (70) is provided for attachment of the forwardmost feed bunk (11) to the prime mover (1) as illustrated in FIGS. 7 and 8. The hitch attachment (70) includes an end stand having a pair of legs (72) with upper hooked ends (74) that attach to opposing sides of the feed bunk rim (14). Bracing (78) extending forward of the ground engaging feet (76) of each leg (72) supports a pin (80) that engages an opening in the plate (16), and supports a pivotally attached clevis (90) for attachment to the prime mover (1). The hitch attachment and end stand (70) may be easily and conveniently removed from the feed bunk as needed, such as to add another feed bunk to the front of the vehicle train. The end stand (70) is then easily and conveniently attached to the forward most feed bunk of the train. When the feed bunks have been towed to the desired location, the prime mover (1) is simply un-hitched from the end stand (70), which then acts to support the forward end of the bunk (11) in a substantially horizontal position.

The novel operation of the steering system (10) of the present invention allowing for the snake-like manueverability of the vehicles (11) will be readily appreciated in the following description of the operation of the steering system.

Operation of the Steering System

As mentioned previously, and as best illustrated in FIGS. 9–11, the axle (24) of the leading vehicle is pivotally attached at a first connection (40), the leading vehicle is pivotally attached to the trailing vehicle at a second connection (50), and the tongue (26) is pivotally attached to the sliding bar (28) at a third connection (60).

The connections (40), (50), and (60) define a triangular linkage best illustrated by reference to FIGS. 3, 10 and 11. The first leg of the triangle is the fixed horizontal distance between the vertical axes of connection (40) and connection (50). The second leg is the fixed horizontal distance between the vertical axes of connection (40) and connection (60), which in the embodiment shown is the length of the tongue (26). The third leg is the variable horizontal distance between the vertical axes of connection (50) and connection (60). The third connection (60) is preferably located rearwardly of connection (50) by a horizontal distance of about twelve inches when the vehicles are in line as shown in FIG. 9. However, it is to be understood that the relative position of the connections (40), (50) and (60) may be modified for other vehicles to provide appropriate clearances and range of motion of the axle (24) and adjacent vehicles (11). For example, the greater the horizontal distance between the second and third connections (50, 60) the sharper (i.e. smaller radius of curvature) the vehicles (11) will be able to turn, assuming there is also enough clearance between adjacent ends of the vehicles (11). Likewise, as the horizontal distance between the second and third connections (50, 60) decreases the larger will be the radius of curvature.

In the preferred embodiment of the steering system (10) for the feed bunks (11) illustrated in the drawings, when the vehicles (11) are traveling in a substantially straight line (FIG. 9), the three connections (40, 50, 60) are substantially aligned along the longitudinal axis of the vehicle train. As the prime mover (1) makes a turn (see FIGS. 1 and 2), the forward end of the forwardmost vehicle (11), pivotally attached to the prime mover (1), will be pulled in the direction of the turn. For example, upon a right turn as illustrated in FIG. 10, the leading vehicle (11a) will pivot about the vertical axis of the second connection (50) while the trailing vehicle (11b) will continue along a substantially straight line of travel until the transverse pulling force of the leading vehicle (11a) causes the forward end of the trailing vehicle (11b) to be pulled to follow the leading vehicle (11a) (i.e. to the right). As the forward end of the leading vehicle (11a) turns, the axle (24) at the rear of the leading vehicle (11a) will tend to rotate in the opposite direction about the vertical axis of the first connection (40) (i.e. to the left in FIG. 10). This is so because one end of the fixed-length tongue (26) is attached substantially perpendicular to the pivotal axle (24) and the other end of the tongue (26) is pinned at connection (60) to the sliding bar (28), which can only move fore and aft along the longitudinal axis of the vehicle (11).

As the leading vehicle (11a) continues to turn, the tongue (26) forces the sliding bar (28) rearwardly as indicated by arrow (61) (FIG. 10). This is so because, as the leading vehicle (11a) begins to turn, the horizontal distance between any point on the leading vehicle (11a) and any point on the trailing vehicle (11b) correspondingly decreases. However, because the length of the tongue (26) is fixed, as the leading vehicle (11a) turns, the sliding bar (28) must move rearwardly to accommodate the fixed length of the tongue (26) as the horizontal distance between the leading and trailing bunks (11a, 11b) decreases. As the vehicles (11) straighten out from the turn (see FIG. 9), the third connection (60) will move forward until it returns to its forwardmost position as indicated in dashed lines in FIG. 10. FIG. 11 shows the operation of the steering system (10) when the vehicles are turning to the left.

It should be appreciated that on the rearmost trailing vehicle (11) the tongue (26) will not be connected to a slide bar (28). Thus, if the tongue (26) is not secured in some manner, the axle (24) on the rearmost trailing vehicle would be free to pivot uncontrolled. To prevent this, FIG. 6 illustrates one method of securing the rearmost axle (24) by reversing or flipping or rotating the axle assembly such that the tongue (26) on the rearmost trailing vehicle (11) is pointed forward and is then secured to a tongue bracket (19) attached to the underside of the body (12). Obviously, there are many other means of securing the axle (24) of the rearmost vehicle, such as by inserting locking pins in the axle mounting plate (20) to prevent the axle from rotating about connection (40).

Therefore, although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A steering system for a multiple vehicle train pulled by a prime mover, the steering system comprising:
 a leading vehicle and a trailing vehicle, each vehicle including a body having a longitudinal axis and a pair of ground engaging wheels attached to a single axle mounted under a rear portion of the body;
 each leading vehicle including a first connection pivotally connecting the single axle to the body about a first vertical axis, and an elongated tongue operably attached to the single axle and disposed to extend rearwardly therefrom;
 a second connection pivotally connecting the bodies of the leading and trailing vehicles about a second vertical axis, the second connection being disposed rearwardly of the first connection; and
 a third connection operably attaching the tongue of the leading vehicle to the body of the trailing vehicle, the third connection being disposed rearwardly of the second connection and being movable fore and aft with respect to the body of the trailing vehicle along the longitudinal axis thereof.

2. The steering system of claim 1 wherein the third connection is a pivotal connection between the tongue and a bar slidably mounted in fore and aft aligned brackets attached to the body of the trailing vehicle, the third connection being about a third vertical axis.

3. The steering system of claim 1 wherein the first, second, and third connections define a triangular linkage with a first leg defined by a first fixed predetermined horizontal distance between the first vertical axis and the second vertical axis, a second leg defined by a second fixed predetermined horizontal distance between the first vertical axis and the third connection, and a third leg defined by a variable horizontal distance between the second vertical axis and the third connection, which distance is varied by the fore and aft movement of the third connection responsive to angular movement of the leading vehicle with respect to the trailing vehicle.

4. The steering system of claim 2 wherein the first, second, and third connections define a triangular linkage with a first leg defined by a first fixed predetermined horizontal distance between the first vertical axis and the second vertical axis, a second leg defined by a second fixed predetermined horizontal distance between the first vertical axis and the third vertical axis, and a third leg defined by a variable horizontal distance between the second vertical axis and the third vertical axis, which distance is varied by the fore and aft movement of the third vertical axis responsive to angular movement of the leading vehicle with respect to the trailing vehicle.

5. The steering system of claim 1 wherein a hitch attachment is removably secured to a forward portion of the body of a frontmost leading vehicle.

6. The steering system of claim 1 including a series of two or more connected adjacent vehicles.

7. The steering system of claim 1 wherein the body of the vehicle is an open top feed bunk having a top peripheral rim and connection plates extending from front and rear portions of the rim.

8. The steering system of claim 5 wherein the body of the vehicle is an open top feed bunk having a top peripheral rim and connection plates extending from front and rear portions of the rim.

9. The steering system of claim 8 wherein the hitch attachment includes an end stand attached to the rim and the front extending connection plate.

10. The steering system of claim 9 wherein the end stand includes a pair of legs having upper ends attached to opposing sides of the peripheral rim near its front portion.

11. The steering system of claim 1 wherein the axle of a rearmost trailing vehicle is secured against pivoting with respect to the body of the rearmost trailing vehicle.

12. The steering system of claim 11 wherein the single axle of the rearmost trailing vehicle is pivoted 180° about the first vertical axis and is disposed to extend forwardly therefrom, and further including a tongue bracket attached to a lower portion of the body and being disposed to selectively receive and secure the tongue to the body.

13. A steering system for a multiple vehicle train pulled by a prime mover, the steering system comprising:
 a leading vehicle and a trailing vehicle, each vehicle including a body and a pair of ground engaging wheels attached to a single axle mounted under a rear portion of the body;
 each leading vehicle including a first connection pivotally connecting the single axle to the body about a first vertical axis, and an elongated tongue operably attached to the single axle and disposed to extend rearwardly normal thereto;
 a second connection pivotally connecting the bodies of the leading and trailing vehicles about a second vertical axis, the second connection being disposed rearwardly of the first connection; and
 a third connection operably attaching the tongue of the leading vehicle to the body of the trailing vehicle, the third connection being disposed rearwardly of the second connection and being movable fore and aft with respect to the body of the trailing vehicle, wherein the third connection is a pivotal connection between the tongue and a bar slidably mounted in fore and aft aligned brackets attached to the body of the trailing vehicle, the third connection being about a third vertical axis.

14. A steering system for a multiple vehicle train pulled by a prime mover, the steering system comprising:
 a leading vehicle and a trailing vehicle, each vehicle including a body and a pair of ground engaging wheels attached to a single axle mounted under a rear portion of the body;
 each leading vehicle including a first connection pivotally connecting the single axle to the body about a first vertical axis, and an elongated tongue operably attached to the single axle and disposed to extend rearwardly normal thereto;
 a second connection pivotally connecting the bodies of the leading and trailing vehicles about a second vertical axis, the second connection being disposed rearwardly of the first connection; and
 a third connection operably attaching the tongue of the leading vehicle to the body of the trailing vehicle, the third connection being disposed rearwardly of the second connection and being movable fore and aft with respect to the body of the trailing vehicle;
 wherein the first, second, and third connections define a triangular linkage with a first leg defined by a first fixed predetermined horizontal distance between the first vertical axis and the second vertical axis, a second leg defined by a second fixed predetermined horizontal distance between the first vertical axis and the third connection, and a third leg defined by a variable horizontal distance between the second vertical axis and the third connection, which distance is varied by the fore and aft movement of the third connection responsive to angular movement of the leading vehicle with respect to the trailing vehicle.

15. The steering system of claim 14 wherein the third connection is a pivotal connection between the tongue and a bar slidably mounted in fore and aft aligned brackets attached to the body of the trailing vehicle, the third connection being about a third vertical axis.

16. The steering system of claim 14 wherein the first, second, and third connections define a triangular linkage with a first leg defined by a first fixed predetermined horizontal distance between the first vertical axis and the second vertical axis, a second leg defined by a second fixed predetermined horizontal distance between the first vertical axis and the third vertical axis, and a third leg defined by a variable horizontal distance between the second vertical axis and the third vertical axis, which distance is varied by the fore and aft movement of the third vertical axis responsive to angular movement of the leading vehicle with respect to the trailing vehicle.

17. The steering system of claim 14 wherein a hitch attachment is removably secured to a forward portion of the body of a frontmost leading vehicle.

18. The steering system of claim 14 including a series of two or more connected adjacent vehicles.

19. The steering system of claim 14 wherein the body of the vehicle is an open top feed bunk having a top peripheral rim and connection plates extending from front and rear portions of the rim.

20. The steering system of claim 17 wherein the body of the vehicle is an open top feed bunk having a top peripheral rim and connection plates extending from front and rear portions of the rim.

21. The steering system of claim 20 wherein the hitch attachment includes an end stand attached to the rim and the front extending connection plate.

22. The steering system of claim 21 wherein the end stand includes a pair of legs having upper ends attached to opposing sides of the peripheral rim near its front portion.

23. The steering system of claim 14 wherein the axle of a rearmost trailing vehicle is secured against pivoting with respect to the body of the rearmost trailing vehicle.

24. The steering system of claim 23 wherein the single axle of the rearmost trailing vehicle is pivoted 180° about the first vertical axis and is disposed to extend forwardly therefrom, and further including a tongue bracket attached to a lower portion of the body and being disposed to selectively receive and secure the tongue to the body.

25. A steering system for a multiple vehicle train pulled by a prime mover, the steering system comprising:

a leading vehicle and a trailing vehicle, each vehicle including a body and a pair of ground engaging wheels attached to a single axle mounted under a rear portion of the body;

each leading vehicle including a first connection pivotally connecting the single axle to the body about a first vertical axis, and an elongated tongue operably attached to the single axle and disposed to extend rearwardly normal thereto;

a second connection pivotally connecting the bodies of the leading and trailing vehicles about a second vertical axis, the second connection being disposed rearwardly of the first connection; and a third connection operably attaching the tongue of the leading vehicle to the body of the trailing vehicle, the third connection being disposed rearwardly of the second connection and being movable fore and aft with respect to the body of the trailing vehicle;

wherein the body of the vehicle is an open top feed bunk having a top peripheral rim and connection plates extending from front and rear portions of the rim.

* * * * *